June 8, 1943.　　　J. D. ROBERTSON　　　2,321,516
TRACTOR DRAW BAR
Filed June 3, 1940　　　3 Sheets-Sheet 1
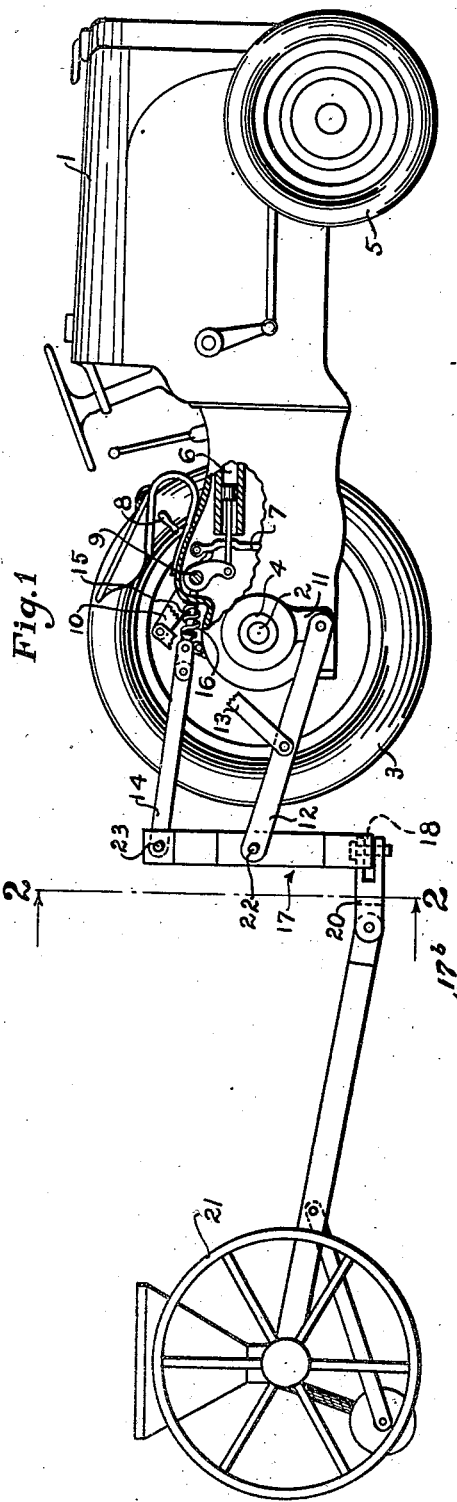
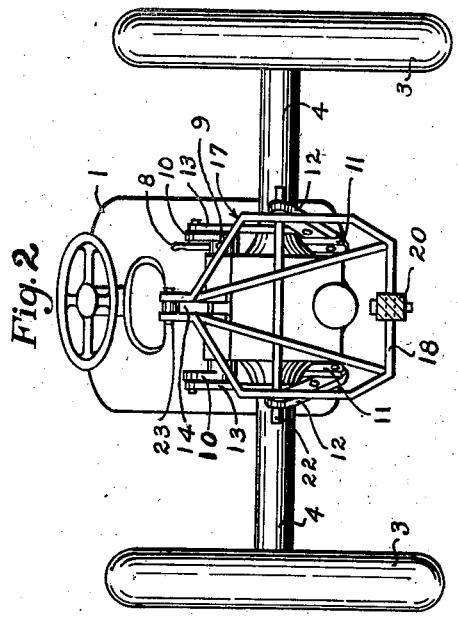
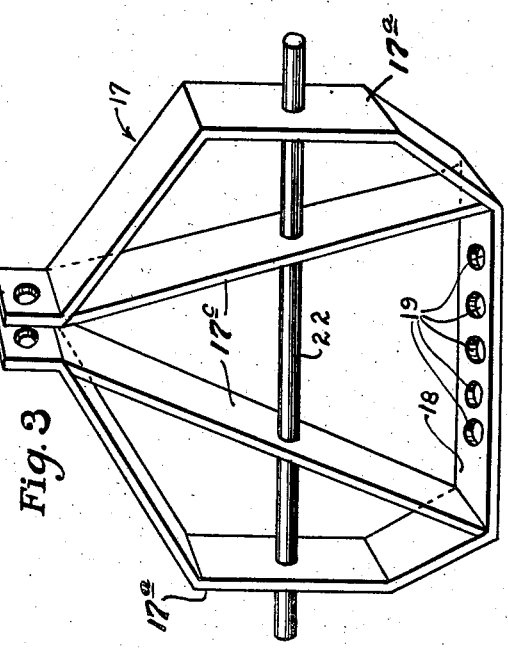
INVENTOR.
Jack D. Robertson
BY
ATTORNEY.

June 8, 1943.                J. D. ROBERTSON                2,321,516
                              TRACTOR DRAW BAR
                    Filed June 3, 1940            3 Sheets-Sheet 2
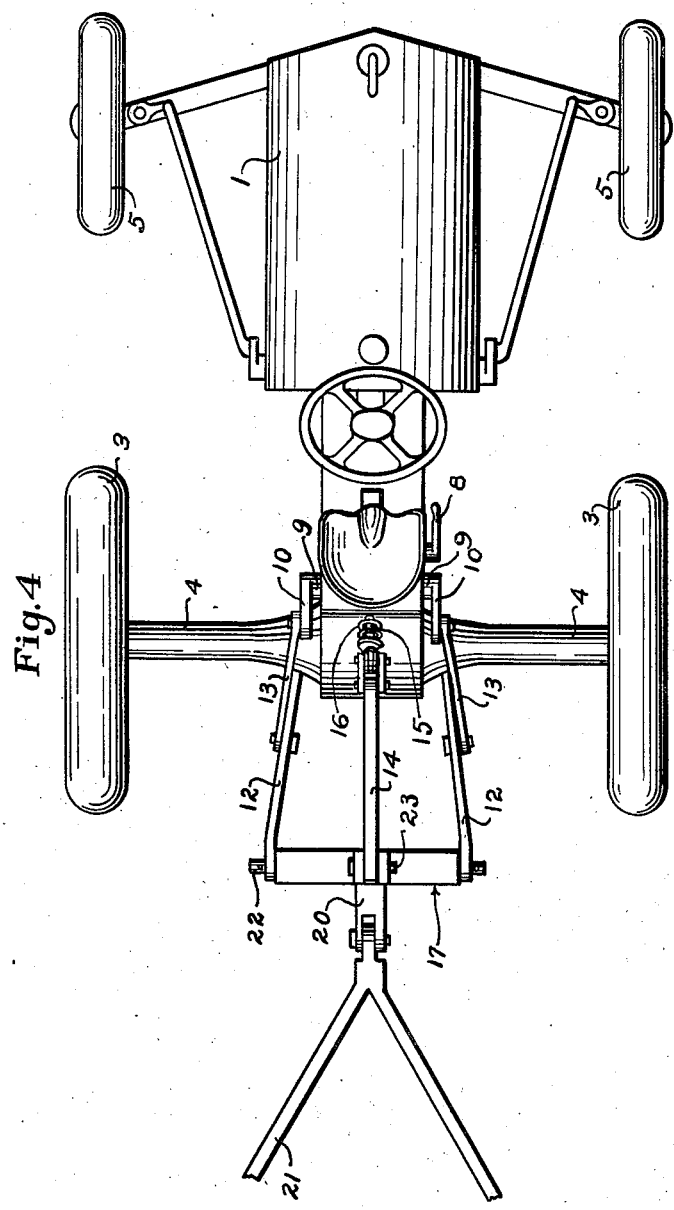
INVENTOR.
Jack D. Robertson
BY
                   his ATTORNEY.

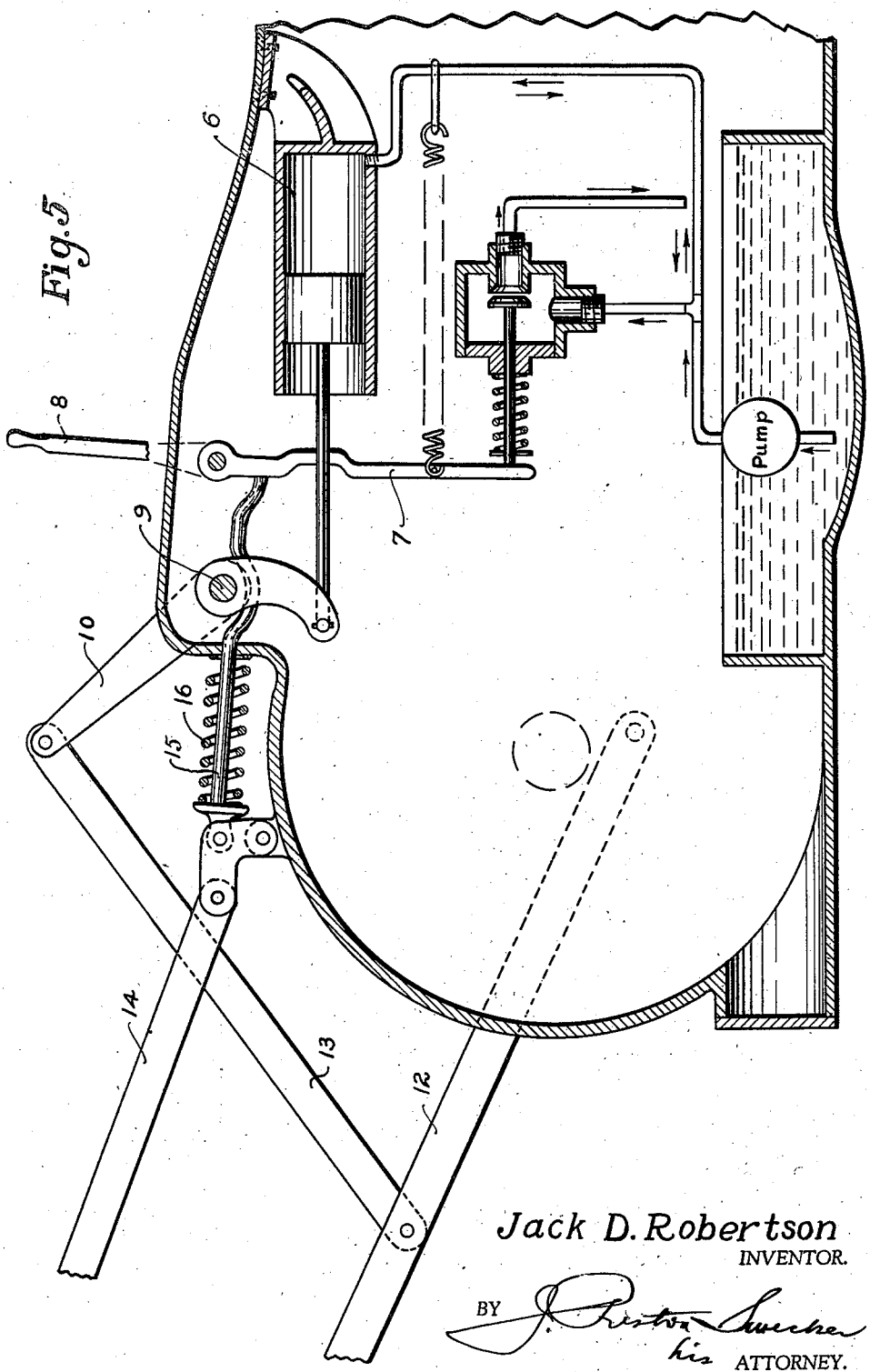

Patented June 8, 1943

2,321,516

UNITED STATES PATENT OFFICE 2,321,516

TRACTOR DRAWBAR

Jack D. Robertson, Ralls, Tex., assignor of one-half to Gilbert O. Paudler, Crosbyton, Tex.

Application June 3, 1940, Serial No. 338,654

10 Claims. (Cl. 280—33.44)

This invention relates to an improvement in draw bars for tractors, and more particularly to the type of draw bar used with automatic linkage systems for drawing implements attached to a tractor.

Power driven tractors which have been used heretofore have been subject to the objecion that, when the implement attached thereto strikes an obstruction that prevents forward motion, the continued rotation of the rear wheels tends to cause the tractor to upset in somersault fashion, frequently injurying the driver and damaging the tractor and the equipment.

It has been proposed to avoid this objection by coupling the implement to the tractor through linkage which has provision through hydraulic mechanism for relieving the pressure on the tractor when the implement strikes an obstruction. The draw bar used heretofore with such linkage has not been constructed and arranged so as to operate the hydraulic mechanism effectively due to the high point of coupling of the implement therewith and the point of connection of the weight at or adjacent the level of the rear axle which prevented it from functioning in the desired manner.

The object of this invention is to improve the construction of the draw bar to provide for a lower point of connection of the implement with the tractor and more effective actuation of the linkage by the draw bar to prevent overturning of the tractor.

This is effectively accomplished by locating the point of drafting force of the draw bar at or adjacent the level of the rear axle, and applying a force above the rear axle substantially equal the force applied below the axle, the draw bar being arranged in an upright position and having provision for attachment of the implement to the lower end portion thereof.

A preferred embodiment of the invention is illustrated in the accompanying drawings, in which:

Fig. 1 is a side elevation of a tractor and implement utilizing the improved form of draw bar, the tractor having a rear wheel removed;

Fig. 2 is a partial rear elevation thereof and partial section on the line 2—2 of Fig. 1;

Fig. 3 is a detached perspective view of the draw bar;

Fig. 4 is a top plan view of the tractor having the draw bar applied thereto; and Fig. 5 is an enlarged vertical section through the rear portion of the tractor showing the draw bar actuating means.

The invention is shown as applied to a power driven tractor having a linkage controlled hydraulic system which may be substantially of the character illustrated in Ferguson patent, No. 2,118,181, May 24, 1938. In such a system, the tractor is constructed with a power plant designated generally by the numeral 1, having power driving connection with the rear axles of the tractor designated 2, upon which are mounted the rear wheels 3. The rear axles 2 extend through axle housings 4. The tractor is provided with the usual front wheels 5.

Mounted within the tractor housing is a hydraulic power device 6 to which liquid is supplied under pressure from a pump within the tractor under control of a valve actuated by a lever 7 which also has a manual control 8 connected therewith. The piston of the power device 6 has a connecting rod attached to a cross shaft 9, journaled in the tractor housing, to the outer ends of which arms 10 are attached.

Attached to the undersides of the rear axle housings 4 are lugs 11, extending downwardly therefrom and having links 12 pivotally supported by the lugs 11 and extending rearwardly therefrom. Intermediate the ends of the links 12 are connecting rods 13 pivoted thereto and to the upper ends of the arms 10. A link 14 extends substantially parallel with the links 12 and has its front end pivotally connected with a rod 15 surrounded by a spring 16 interposed between the rod 15 and the tractor housing tending to move said rod in a rearward direction. The rod 15 extends to and is connected with the lever 7 that controls the valve which regulates the admission of liquid to the power device 6 which moves the piston thereof rearwardly to raise upward on the arms 10 and links 13, substantially in the manner described and set forth in the above-mentioned Ferguson patent, No. 2,118,181.

Connected with the rear end portions of the links 12 and 14 is a draw bar designated generally by the numeral 17 which is shown in Figs. 2 and 3 as of substantially polygonal shape with outwardly bulging sides 17a extending upwardly from opposite ends of a connecting bar 18 which forms the base of the draw bar, and preferably being formed integral with the sides thereof, which sides terminate in upturned ears 17b. The connecting bar 18 has a plurality of openings 19 therein for detachable connection with a clevis 20 attached to an implement, one form of which is shown generally at 21. The clevis may be connected selectively with any desired one of the holes 19 to vary the point of connection of the implement with the draw bar as may be desired.

The sides 17a of the draw bar 17 have a rod 22 extending transversely therethrough, the outer ends of which rod form pivotal connections with the links 12, which pivotal connections are disposed at or adjacent the midpoint of the length of the draw bar 17. The rod 22 also extends through diagonal braces 17c welded to the sides of the draw-bar frame, as shown in Fig. 3, and bracing the draw-bar and the rod. The upper end of the draw-bar 17 is pivotally connected by a pivot pin 23, passing through the ears 17b, with the rearward end of the link 14. The ratio of the distance between the pivots 22 and 23 and the pivots 22 and connecting bar 18 is substantially twelve to fourteen. It has been found by experiment that the pivots 22 and 23 should be spaced apart a distance of twelve inches, while the pivots 22 should be spaced fourteen inches from the connecting bar 18, for best results.

When the tractor is operated to draw forward the implement 21, the operator first swings the lever 8 to the right in Figs. 1 and 5, which moves the valve lever 7 to open the control valve, allowing the liquid to escape from the cylinder of the power device 6. The piston of said power device then moves inward under the influence of the weight of the draw bar 17, which is thus permitted to move downward. The draft which is then imposed on the draw bar 17, tends to turn it about the pivot rod 22. This movement is resisted by the spring 16 which is compressed by the link 14 moving to the right and thereby moving the lever 7 to close the control valve, and holding the draw bar 17 in its draft position. The force exerted downward by the arms 10 will apply a reaction to the tractor housing forwardly of the rear axles 2, such as will tend to hold the tractor in a level position with the forward end continuously resting on the ground. This will also tend to increase the traction of the rear wheels with the ground, thereby preventing a backward upsetting of the tractor.

In this way, provision may be made for the operation of relatively heavy implements even by light weight tractors without danger of upsetting, and yet with full assurance of adequate draft for the implements. Provision is made also to raise and lower the draw bar automatically or when desired in the usual way, by the actuation of the hydraulic power device incorporated in the tractor.

I claim:

1. The combination with a tractor having a hydraulic power device therein and means for controlling the supply of fluid thereto, of a draw bar extending substantially in an upright direction rearwardly of the tractor and having means for connection with an implement adjacent the lower end portion thereof, and links pivotally connected with the draw bar intermediate the ends thereof and adjacent the upper end thereof respectively, one of said links being pivotally connected with the tractor and the other being operatively connected with the controlling means.

2. The combination with a tractor having a hydraulic power device therein and means for controlling the supply of fluid thereto, of a draw bar extending substantially in an upright direction rearwardly of the tractor, said draw bar having spaced upwardly extending sides with a connecting bar joining the lower portions of said sides, a link pivotally connected with the upper end portion of the draw bar and operatively connected with the controlling means, and links pivotally connected with the sides of the draw bar and with the tractor.

3. The combination with a tractor having a hydraulic power device therein and means for controlling the supply of fluid thereto, of a draw bar extending substantially in an upright direction rearwardly of the tractor, said draw bar having spaced upwardly extending sides with a connecting bar joining the lower portions of said sides, a link pivotally connected with the upper end portion of the draw bar and operatively connected with the controlling means, and links pivotally connected with the sides of the draw bar and with the tractor, the first-mentioned link having connection with the tractor above and forwardly of the rear axles of the tractor and the last-mentioned links having connection with the tractor below the rear axles thereof.

4. In a tractor of the character having a structure with upper and lower links hinged thereto, a power device on the tractor having means connected with the lower link for raising the same, and controlling means for the power device connected with the upper link, the combination with said upper and lower links, of an upright draw bar for attaching an agricultural implement to the tractor, said draw bar having implement attaching means at the lower end portion thereof, means for pivotally connecting the upper end portion of the draw bar with the upper link, and means for pivotally connecting the intermediate portion of the draw bar with the lower link.

5. In a tractor of the character having a structure with a pair of lower links hinged thereto in transversely spaced relation, an upper link hinged to the tractor structure, a hydraulic power device on the tractor having means connected with the lower links for raising the same, and controlling means for the power device connected with the upper link, the combination with said upper and lower links, of an upright draw bar for attaching an agricultural implement to the tractor and having implement attaching means at the lower end portion thereof, means for pivotally connecting the upper end portion of the draw bar with the upper link and a pivot rod extending transversely of the draw bar intermediate said end portions thereof and pivotally connecting said pair of lower links with the draw bar.

6. In a tractor of the character having a structure with a pair of lower links hinged thereto in transversely spaced relation, an upper link hinged to the tractor structure, a hydraulic power device on the tractor having means connected with the lower links for raising the same, and controlling means for the power device connected with the upper link, the combination with said upper and lower links, of an upright draw bar for attaching an agricultural implement to the tractor and having spaced upright sides with a connecting bar between the lower end portions thereof adapted for attachment to the implement, means for pivotally connecting the upper end portion of the draw bar with the upper link, and a pivot rod extending laterally from the upright sides intermediate the end portions thereof and pivotally connecting said lower links with the draw bar.

7. In a tractor of the character having a structure with a pair of lower links hinged thereto in transversely spaced relation, an upper link hinged to the tractor structure, a hydraulic power device on the tractor having means connected with the lower links for raising the same, and controlling means for the power device connected with the upper link, the combination with said upper and lower links, of an upright draw bar for attaching an agricultural implement to the tractor and having spaced upright sides with a connecting bar between the lower end portions thereof adapted for attachment to the implement, means for pivotally connecting the upper end portion of the draw bar with the upper link, a pivot rod extending laterally from the upright sides intermediate the end portions thereof and pivotally connecting said lower links with the draw bar, and braces extending upwardly from opposite ends of the connecting bar to the upper ends of the upright sides and joined thereto, the intermediate portions of said braces being spaced from the upright sides and connected with the pivot rod.

8. A draw bar adapted for attachment of an agricultural implement to a tractor, said draw bar comprising spaced upright sides with a connecting bar between the lower end portions thereof for attachment to the implement, said upright sides having pivot means at the upper end portions thereof, and a pivot rod extending laterally from the upright sides intermediate the end portions thereof for connection with tractor attachments.

9. A draw bar adapted for attachment of an agricultural implement to a tractor, said draw bar comprising spaced upright sides converging toward their upper ends with a connecting bar between the lower end portions thereof for attachment to the implement, said upright sides having pivot means at the upper end portions thereof, and a pivot rod extending laterally from the upright sides and carried thereby intermediate the end portions thereof for connection with tractor attachments.

10. A draw bar adapted for attachment of an agricultural implement to a tractor, said draw bar comprising spaced upright sides with a connecting bar between the lower end portions thereof for attachment to the implement, said upright sides having pivot means at the upper end portions thereof, a pivot rod extending laterally from the upright sides intermediate the end portions thereof for connection with tractor attachments, and braces extending upwardly from opposite ends of the connecting bar to the upper ends of the upright sides and joined thereto, the intermediate portions of the braces being spaced from the upright sides and connected with the pivot rod.

JACK D. ROBERTSON.